United States Patent

Takuma et al.

Patent Number: 5,658,707
Date of Patent: Aug. 19, 1997

[54] OPTICAL RECORDING MEDIA

[75] Inventors: Keisuke Takuma; Tsutami Misawa, both of Kanagawa-ken; Masatoshi Yanagimachi, Chiba-ken; Hideki Umehara, Kanagawa-ken; Yoshiteru Taniguchi, Kanagawa-ken; Sumio Hirose, Kanagawa-ken, all of Japan

[73] Assignee: Mitsui Toatsu Chemicals, Inc., Tokyo, Japan

[21] Appl. No.: 543,076

[22] Filed: Oct. 13, 1995

[30] Foreign Application Priority Data

Oct. 18, 1994 [JP] Japan ................................ 6-252449

[51] Int. Cl.⁶ ............................................. G11B 7/24
[52] U.S. Cl. ........................ 430/270.15; 430/270.16; 430/270.2; 430/945
[58] Field of Search ................. 430/270.15, 270.16, 430/270.2, 270.21, 945; 369/284, 288

[56] References Cited

U.S. PATENT DOCUMENTS

| | | | |
|---|---|---|---|
| 4,798,891 | 1/1989 | Franck et al. | 540/472 |
| 4,873,131 | 10/1989 | Kashima et al. | 430/270.16 |
| 5,090,009 | 2/1992 | Hamada et al. | 369/284 |
| 5,124,067 | 6/1992 | Itoh et al. | 252/299.2 |
| 5,486,437 | 1/1996 | Iwamura et al. | 430/270.16 |

FOREIGN PATENT DOCUMENTS

| | | |
|---|---|---|
| 0019329 | 11/1980 | European Pat. Off. . |
| 264928 | 4/1988 | European Pat. Off. . |
| 281287 | 11/1991 | Japan . |
| 290835 | 12/1991 | Japan . |
| 40162 | 2/1994 | Japan . |
| 336086 | 12/1994 | Japan . |

OTHER PUBLICATIONS

Agnew. Chem. Int. Ed. Engl. 25 (1986), No. 12 pp. 1100–1101, "Synthesis of a Fourfold Enlarged Porphyrin with an Extremely Large, Diamagnetic Ring–Current Effect".

Jpn. J. Appl. Phys. vol. 31 (1992), pp. L249–L251, "Third-Order Optical Nonlinearities in Porphyrins with Extended π–Electron Systems".

Primary Examiner—John A. McPherson
Attorney, Agent, or Firm—Burns, Doane, Swecker & Mathis

[57] ABSTRACT

An optical recording medium has a recording layer, a reflective layer and a protective layer, all of which are arranged on a substrate. The recording layer contains a porphyrin compound represented by the following formula (1):

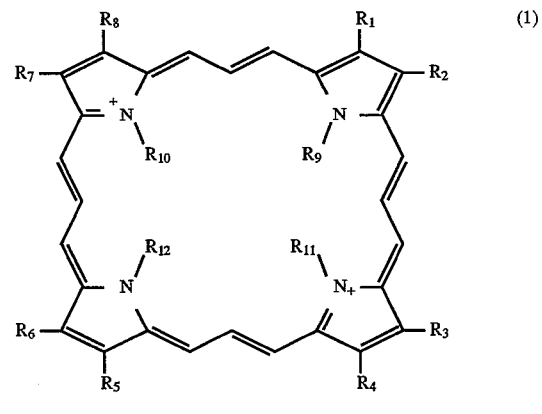

wherein $R_1$ to $R_8$ independently represent a hydrogen atom, an alkyl group, an alkoxy group, an alkylcarbonyl group, an alkoxycarbonyl group, an alkylthio group or a halogen atom, $R_9$ to $R_{12}$ independently represent a hydrogen atom or an alkyl group, and $X^-$ represents an anion.

7 Claims, 1 Drawing Sheet

OPTICAL RECORDING MEDIA

BACKGROUND OF THE INVENTION

1. Field of the Invention

This invention relates to optical recording media, each, having a recording layer containing at least a dye and a reflective layer, both on a transparent substrate, and permitting recording and reproduction with a laser beam of a wavelength selected from 620 to 690 nm, and also to compact disks (hereinafter called "CD-Rs") permitting recording and reproduction with a laser beam of a wavelength selected from 770 to 830 nm.

2. Description of the Related Art

Optical recording media of the single plate type that a dye is arranged as a recording layer, a metallic reflective layer is applied over the recording layer to provide a greater reflectance and a protective layer is arranged over the reflective layer are disclosed, for example, in Optical Data Storage, 1989, Technical Digest Series, Vol. 1, 45 (1989). Further, media making use of a cyanine dye or a phthalocyanine dye, the latter dye being useful in the present invention, in the recording layers of such media have been put as CD-Rs on the market.

These CD-R media are based on the Orange Book Standards, and have a reflectance of at least 65% to a light of wavelength ($\lambda 1$) selected from 770 to 830 nm and absorb light of this $\lambda 1$. They are hence characterized in that they permit recording with a semiconductor laser of 780 nm and also reproduction by a commercially-available CD player or CD-ROM player with a semiconductor laser of 780 nm mounted thereon.

On the other hand, current optical recording media have a capacity as small as 650 MB and, when information of large capacity such as digital movies are recorded, the recordable time length is as short as 15 minutes or less. Further, under the current tendency toward smaller equipments, the conventional recording density will lead to the problem of insufficient capacity if media are rendered smaller.

Recently, semiconductor lasers of a wavelength ($\lambda 2$) selected from 620 to 690 nm have been developed, thereby progressively making it possible to perform high-density recording and/or reproduction. Use of these semiconductor lasers are now under study for the development of high-density recording media having a recording capacity 5 to 8 times as much as the conventional media and also of players which are compatible with such high-density recording media and can hence play them. In particular, a system which permits digital recording of movies for 2 hours or longer has now been developed as a DVD (digital video disk) system, and marketing of its play-only media and players is about to be started soon.

As one of such high-density recording media, there can be mentioned a play-only medium which has been fabricated, like conventional CDs and CD-ROM media, by forming pits upon formation of a substrate and arranging a reflective layer of aluminum. Because this play-only high-density recording medium has a reflectance as high as 70% or even greater, high-density compatible players for such high-density recording media are designed to permit playing play-only media having a high reflectance of 70% or greater. Needless to say, it is also desired for these players to permit playing conventional media, for example, CDs, CD-ROMs and CD-Rs.

Conventional CD and CD-ROM media are for play only and their fabrication process is the same as that employed for the above-described play-only high-density recording media. They have a high reflectance of 70% or greater to a $\lambda 2$ laser beam. They can therefore be readily played even by the high-density compatible players.

On the other hand, the CD-R media which are currently furnished to the market certainly have a reflectance of 65% or higher to laser beams having a wavelength of about 780 nm and can therefore be played even by commercially-available CD or CD-ROM players. They however develop numerous drawbacks when player with a $\lambda 2$ laser beam. The reflectance becomes very small, that is, as low as 10% or less. Moreover, the degree of modulation is also small and, on top of that, the reflectance of a recorded area becomes greater than that of an unrecorded area, in other words, so-called "low to high" recording takes place. This record is opposite in polarity to those of ordinary CDs ("high to low" records) and is not preferred. In addition, substantial distortion is observed in the recorded waveforms. Due to these numerous drawbacks, it has heretofore been difficult to play conventional CD-R media by a high-density compatible player with a laser of a wavelength ($\lambda 2$) selected from 620 to 690 nm.

For example, U.S. Pat. No. 5,090,009 discloses a CD-R medium fabricated by successively stacking a dye-containing recording layer, a reflective layer and a protective layer on a substrate and also a medium provided with an interference layer between the substrate and the recording layer or the recording layer and the reflective layer of the CD-R medium. Also disclosed therein are optical constants of the recording layer and its thickness, which are required to meet the CD Specification (the Red Book) and to permit recording. It is certainly true that the disclosed media absorb a portion of a 780 nm laser beam employed for ordinary CDs and provide a reflectance of 70% or higher, thereby permitting recording and reproduction with a laser beam of this wavelength. They are however not intended to perform recording and/or reproduction with a laser beam of a wavelength ($\lambda 2$) selected from 620 to 690 nm, and nothing is disclosed about the reflectance to the laser beam of the above wavelength, the optical constants of the recording layer and the optical pass length of the interference layer. The above patent discloses many examples of media without any interference layer and also of media with an interference layer composed of an inorganic compound or a polymer. However, the medium making use of an indodicarbocyanine dye in its recording layer has a reflectance as low as 10% or even less to a laser beam ($\lambda 2$) of a wavelength selected from 620 to 690 nm as will be described subsequently in a comparative example, and recording thereon is the "low-to-high" recording that the reflectance of a recorded area is higher than that of an unrecorded area. This medium is therefore not preferred. The lower reflectance at 620 to 690 nm can be attributed to the fact that optical characteristics of dyes employed in CD-R media have high wavelength-dependency, the above-described indodicarbocyanine dye has a very large absorption at 600 to 750 nm when measured in the from of a recording layer, and the thickness and optical constants (refractive index, extinction coefficient) of each CD-R medium are designed to have a large reflectance to a light beam around 780 nm. Further, the above patent also discloses, in Examples 8 and 14, media each of which is provided with a recording layer of a t-butyl-substituted phthalocyanine dye different from a phthalocyanine dye employed in a recording layer in the present invention and with an interference layer composed of a polymer or an inorganic compound. Although these media successfully meet the CD Specifications insofar as their reflectances and modulation degrees are concerned, substantial distortion is observed in the waveform of reproduced signals when signals recorded at the same pulse width modulation as that employed for CDs are reproduced with a laser beam of a wavelength ($\lambda 2$) selected from 620 to 690 nm. Due to a large error rate and jitter, such media cannot be played by any high-density compatible player.

European Patent No. 19329 discloses a medium, which makes use of a VO-phthalocyanine dye as a recording layer and is provided, over the recording layer, with an 300 nm interference layer made of cellulose. However, this patent is also intended to improve the reflectance and recording sensitivity to a particular single wavelength. Its recording layer is hence not optimized so that, as in the present invention, recording and reproduction can be performed with two laser beams, one being a laser beam of a wavelength ($\lambda 1$) selected from 770 to 830 nm and the other being a laser beam of a wavelength ($\lambda 2$) selected from 620 to 690 nm. When signals recorded on the above medium at the same pulse width modulation as that employed for CDs are reproduced with the laser beam of the wavelength ($\lambda 2$) selected from 620 to 690 nm, substantial distortion is also observed in the waveform of the signals so reproduced. Again, due to a large error rate and jitter, the above medium cannot be played by any high-density compatible player.

U.S. Pat. No. 5,124,067 discloses many dyes similar to those useful in the recording layer of each medium according to the present invention and also many media making use of such dyes. The media disclosed, for example, in Examples 98, 100 and 102 of this patent can meet the CD Specification but, when played with a laser beam of a wavelength ($\lambda 2$) selected from 620 to 690 nm, the recording mode becomes "low to high", the reflectance is as low as 10% or less, large distortion is observed in the reproduced waveform of signals recorded at the same pulse width modulation as that employed for CDs, and the error rate and jitter are significant. They cannot accordingly be played by any high-density compatible player.

Japanese Patent Laid-open No. 281287/1991 discloses a medium making use of a mixed dye as a recording layer, said mixed dye consisting (A) a dye having an absorption curve with a longer-wavelength-side end located at 780 nm and a complex refractive index characterized by a value of 0.2 or smaller as the absolute value of an imaginary part of its refractive index as measured at 780 nm and (B) a trimethine cyanine dye having an absorption maximum on aside of shorter wavelengths than the absorption maximum wavelength of the dye (A). This medium is excellent in durability and meets the CD Specification. It is however not optimized that reproduction can be performed with a laser beam of a wavelength ($\lambda 2$) selected from 620 to 690 nm. As is understood from its Examples, the trimethine cyanine dye and the pentamethine cyanine dye are used in proportions of 50 wt. %, respectively, so that the absorption for the laser bean of the wavelength ($\lambda 2$) selected from 620 to 690 nm is excessive, resulting in a reflectance lower than 15%. The above medium can therefore hardly be played by any high-density compatible player.

Japanese Patent Laid-open No. 336086/1994 discloses a medium making use of a mixture as a recording layer, said mixture consisting of trimethine and pentamethine cyanine dyes of particular structures. This medium is intended to permit recording and reproduction with laser beams of 780 nm and 488 nm. The ratio of the trimethine cyanine dye to the pentamethine cyanine dye is 1:10. When the pentamethine cyanine dye is used in such a large proportion, the absorption for a laser beam of a wavelength ($\lambda 2$) selected from 620 to 690 nm is excessive, resulting in a reflectance lower than 15%. The above medium can therefore hardly be played by any high-density compatible player.

Japanese Patent Laid-open No. 40162/1994 discloses a medium making use of a trimethine cyanine dye in its recording layer. This medium is intended to permit recording and reproduction with a laser beam of 630 nm and, as the recording layer does not show any absorption for a laser beam of 780 nm, does not permit recording with the laser beam of 780 nm.

Japanese Patent Laid-open No. 290835/1991 discloses a medium provided with an interference layer of a low molecular organic substance between a recording layer and a reflective layer made of an aluminum alloy. This medium is provided with the interference layer to achieve a reflectance of 70% or higher at 780 nm by using the aluminum alloy instead of costly gold in the reflective layer. Although it can certainly provide a reflectance as high as 70% or even greater at 780 nm, the reflectance to a light beam of a wavelength ($\lambda 2$) selected from 620 to 690 nm is low so that the above medium cannot be played by any high-density compatible player.

As has been described above, there is no optical recording medium, which has a recording layer containing at least a dye and a reflective layer, provides a reflectance of 65% or higher to a laser beam of a wavelength ($\lambda 1$) selected from 770 to 830 nm, has high sensitivity and excellent recording characteristics, can be played by a commercially-available CD or CD-ROM player, and can also be played even by a player equipped with a laser of a wavelength ($\lambda 2$) selected from 620 to 690 nm and compatible with high-density recording media.

SUMMARY OF THE INVENTION

An object of this invention is to provide a medium, which permits recording and reproduction with a laser beam of a wavelength ($\lambda 2$) selected from 620 to 690 nm and meets the Orange Book, the current specification for CD-Rs [reflectance of 65% or higher to a laser beam of a wavelength ($\lambda 1$) selected from 770 to 830 nm and capability of recording and reproduction with the laser beam].

With a view to achieving the above object, the present inventors have proceeded with an extensive investigation, leading to the proposal of the present invention. Namely, the above object can be achieved by the following invention:

(1) In an optical recording medium having a recording layer, a reflective layer and a protective layer, all arranged on a substrate, the improvement wherein said recording layer comprises a porphyrin compound represented by the following formula (1):

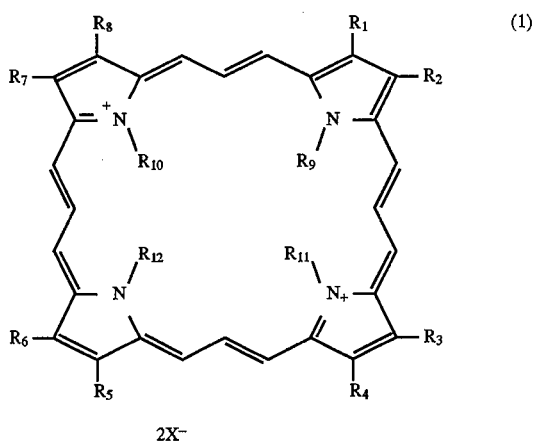

(1)

2X⁻ wherein $R_1$ to $R_8$ independently represent a hydrogen atom, an alkyl group, an alkoxy group, an alkylcarbonyl group, an alkoxycarbonyl group, an alkylthio group or a halogen atom, $R_9$ to $R_{12}$ independently represent a hydrogen atom or an alkyl group, and $X^-$ represents an anion.

(2) The optical recording medium, wherein said recording layer further comprises, in combination with the compound represented by the formula (1), a light absorbing compound having an absorption maximum in a wavelength range of from 650 to 900 nm.

(3) The optical recording medium, wherein said optical recording medium has a reflectance of at least 15% to a beam selected from red lasers of 620 to 690 nm in wavelength as measured through the substrate and permits at least reproduction with a red laser having a wavelength of from 620 to 690 nm.

(4) The optical recording medium, wherein said optical recording medium has a reflectance of at least 15% to a beam selected from red lasers of 620 to 690 nm in wavelength as measured through the substrate and permits recording and reproduction with a red laser having a wavelength of from 620 to 690 nm.

(5) The optical recording medium, wherein said optical recording medium has a reflectance of at least 65% to a beam selected from near infrared lasers of 770 to 830 nm in wavelength as measured through the substrate and permits reproduction with a near infrared laser having a wavelength of from 770 to 830 nm.

(6) The optical recording medium, wherein said optical recording medium permits recording and reproduction with a near infrared laser having a wavelength of from 770 to 830 nm.

(7) The optical recording medium, wherein said light absorbing compound is a phthalocyanine compound.

(8) The optical recording medium, wherein said light absorbing compound is a penta- or hepta-methinecyanine compound.

According to the present invention, the use of the porphyrin compound as a dye and, preferably, the light absorbing compound in the recording layer has made it possible not only to permit recording and reproduction with a red laser of a recording and reproducing wavelength of 620 to 690 nm, which has been finding increasing use in recent years, but also to provide compatible optical recording media which can also be played with a conventionally-used near infrared laser beam selected from 770 to 830 nm.

DETAILED DESCRIPTION OF THE INVENTION

Figure 1:
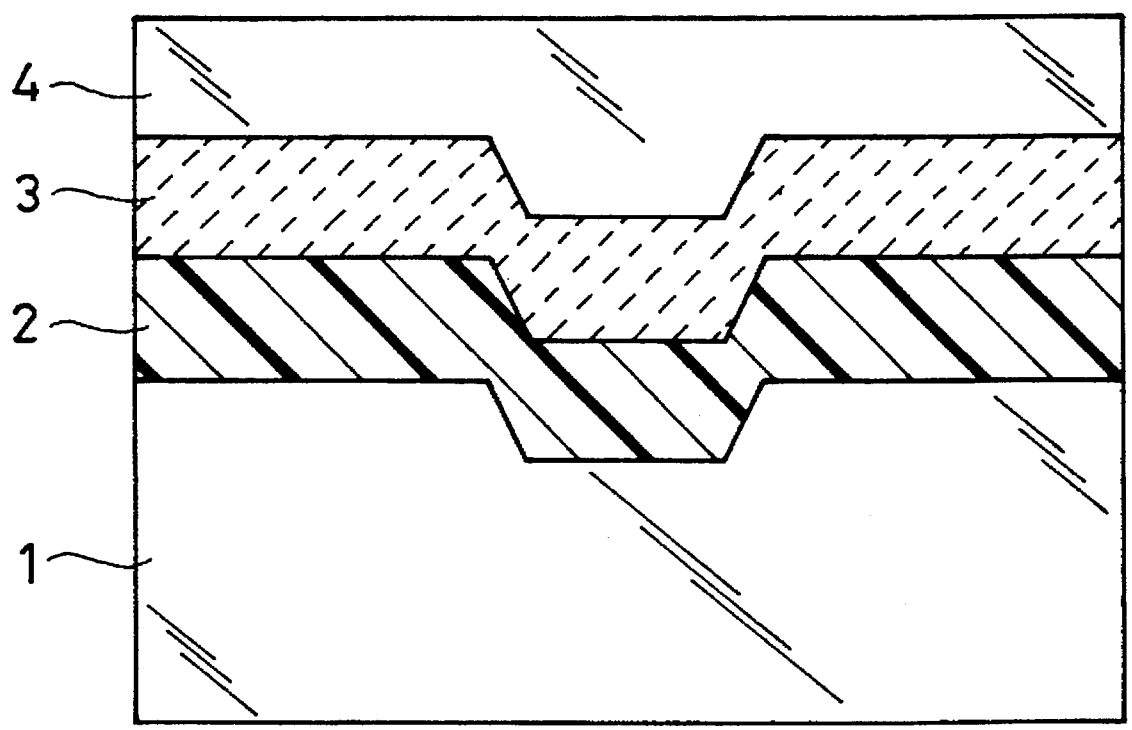
FIG. 1 is a schematic cross-sectional view illustrating one structural example of an optical recording medium according to the present invention.

A description will hereinafter be made of specific features of the present invention.

Each optical recording medium according to the present invention has a recording layer and a reflective layer, both, on a substrate. The term "optical recording medium" as used herein means both an optical play-only medium with information already recorded therein and an optical recording medium permitting recording of information therein and reproduction of the same. It is however to be noted that, in the present specification, a description will be made of the latter one as an appropriate example, namely, an optical recording medium permitting recording of information therein and reproduction of the same, especially, an optical recording medium with a recording layer, a reflective layer and a protective layer formed in this order on a substrate. This optical recording medium has a four-layer structure as depicted in FIG. 1. Namely, a recording layer 2 is formed on a substrate 1, a reflective layer 3 is arranged over and in close contact with the recording layer 2, and further, a protective layer 4 is arranged covering the reflective layer 3.

No particular limitation is basically imposed on the material of the substrate, insofar as it remains transparent at the wavelengths of a recording laser beam and a reproducing laser beam. Usable examples can include high molecular materials, e.g., polycarbonate resins, vinyl chloride resin, acrylic resins such as poly(methyl methacrylate), polystyrene resin and epoxy resins; and inorganic materials such as glass. Such a substrate material is molded or otherwise formed into a disk shape or the like by injection molding or the like. Grooves may be formed in a surface of the substrate as needed.

As description will next be made of specific examples of $R_1$ to $R_{12}$ in the porphyrin compound employed as a dye in the recording layer and represented by the formula (1). Illustrative of $R_1$ to $R_8$ can include a hydrogen atom; alkyl group such as methyl, ethyl, n-propyl, i-propyl, n-butyl, i-butyl, t-butyl, n-amyl, i-amyl, n-hexyl, cyclohexyl, n-octyl, 3,5,5-trimethylhexyl and n-dodecyl; alkoxy groups such as methoxy, ethoxy, n-propoxy, i-propoxy, n-butoxy, t-butoxy, n-amyloxy, n-hexyloxy and n-dodecyloxy; alkylcarbonyl groups such as acetyl, ethylcarbonyl, i-propylcarbonyl and n-bytylcarbonyl; alkoxycarbonyl groups such as methoxycarbonyl, ethoxycarbonyl, i-propoxycarbonyl and sec-butoxycarbonyl; alkylthio groups such as methylthio, ethylthio, n-propylthio, n-butylthio and n-hexylthio; and halogen atoms such as fluorine, chlorine and bromine, whereas examples of $R_9$ to $R_{12}$ can include a hydrogen atom, a methyl group, an ethyl group and a propyl group.

$X^-$ may typically indicate an anion such as $F^-$, $Cl^-$, $Br^-$, $I^-$, $CH_3COO^-$, $CF_3COO^-$, $BF_4^-$, $B(C_6H_5)_4^-$, $PF_6^-$, $CH_3OPO_3^-$ and $C_6H_5SO_3^-$. Instead of $2X^-$, a divalent anion such as $SO_4^{2-}$ or $C_6H_5(SO_3^-)_2$ can also be used.

In the present invention, no particular limitation is imposed on the content of the porphyrin compound in the recording layer. In general, however, the porphyrin compound may amount to 30 to 100 wt. % or so of the recording layer.

The porphyrin compound defined in the present invention can be synthesized, for example, by the following route, based on a process disclosed in a publication (M. Gosmann, B. Franck, Angew. Chem. Int. Ed. Engl., Vol. 25, pp. 1100–1101, 1986).

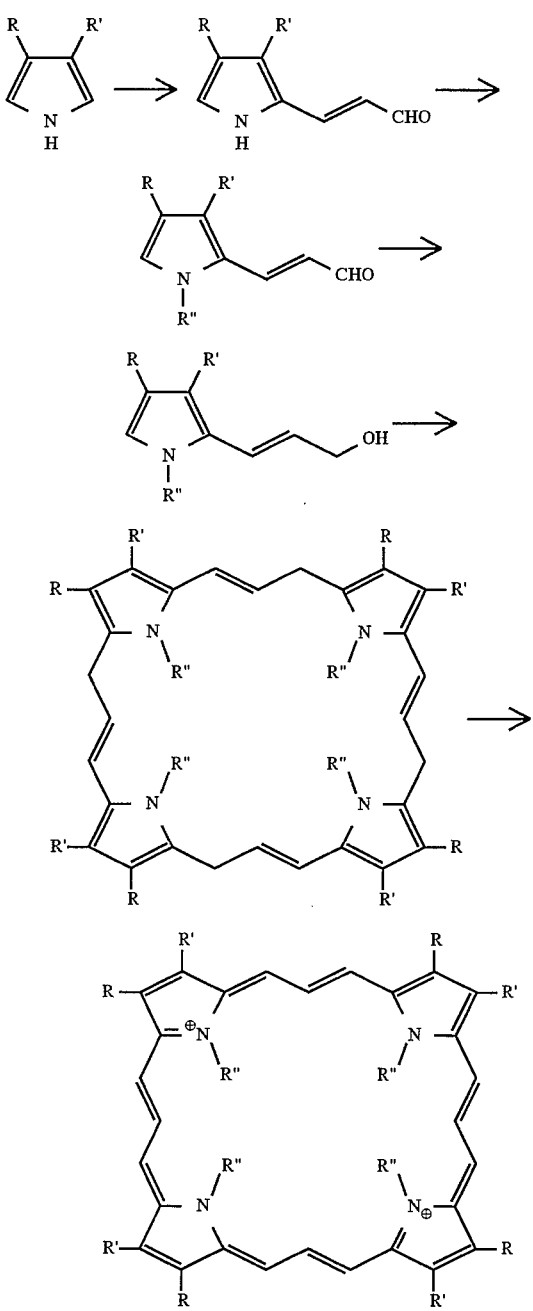

In a preferred embodiment of the present invention, a light absorbing compound may additionally be used for the improvement of sensitivity in combination with the porphyrin compound represented by the formula (1). Although no particular limitation is imposed on the content of the light absorbing compound, it can be used in an amount of 0.1 to 50 wt. %, preferably 1 to 25 wt. % or so (based on the total amount of the porphyrin compound represented by the formula (1) and the light absorbing compound).

Specific examples of such light absorbing compounds include phthalocyanine dyes, naphthalocyanine dyes, cyanine dyes, styryl dyes, merocyanine dyes, squarylium dyes, pyrylium dyes, anthraquinone dyes, naphthoquinone dyes, benzoquinone dyes, other porphyrin compounds, azo dyes, dithiol-metal complex dyes, indophenol dyes, triphenylmethane dyes, xanthene dyes, indanthrene dyes, indigo dyes, oxazine dyes, thiazine dyes, acridine dyes, indoaniline dyes, and azulenium dyes. These dyes may contain one or more metal elements.

Among these, as dyes having an absorption maximum in a range of from. 650 nm to 900 nm, penta- and heptamethinecyanines, phthalocyanine and naphthalocyanine dyes are preferred for the large molar extinction coefficient of their absorption maximums. Phthalocyanine and naphthalocyanine dyes are particularly preferred for their excellent light fastness and hydrothermo-resistance.

Upon formation of the recording layer, a binder can be used in combination as needed. Preferred examples of the binder can include nitrocellulose, cellulose acetate, ketone resins, acrylic resins, polyvinyl butyral, polycarbonates, and polyolefins.

From the viewpoint of permitting coating in a dissolved form in a solvent, preferred are those having an absorption maximum at 650 nm to 900 nm and excellent compatibility with the porphyrin compound represented by the formula (1) out of the dyes exemplified above. [Incidentally, the term "absorption maximum" as used herein indicates a greatest absorption or a nearly greatest absorption and, where plural peaks are involved, should be interpreted to indicate the one appeared at the longest wavelength. Further, absorption characteristics of a dye differ depending on the state of association so that the absorption characteristics vary depending on whether the dye is in the form of a solution or a solid (film) and also on its concentration. However, the term "absorption maximum wavelength" as used herein is intended to mean a value as measured in the form of a film of the dye alone.]

It is disclosed in a publication [Hosoda et al., Jpn. J. Appl. Phys., Vol. 31, PPL249–L251 (1992)] that certain porphyrin compounds out of the conventional ones represented by the formula (1), said certain porphyrin compounds containing $C_2H_5$ as $R_1$ to $R_8$, $CH_3$ as $R_9$ to $R_{12}$ and $CF_3COO^-$ as $X^-$, can form excellent transparent thin films when spin-coated on substrates such as glass substrates. This publication is directed to 3-order non-linear optical materials, that is, a technical field totally different from that of the present invention, and states that the above compounds can provide excellent devices as the non-linear optical materials.

Among the light absorbing compounds having an absorption maximum at 650 to 900 nm as described above, most preferred are phthalocyanine compounds represented by the following formula (2):

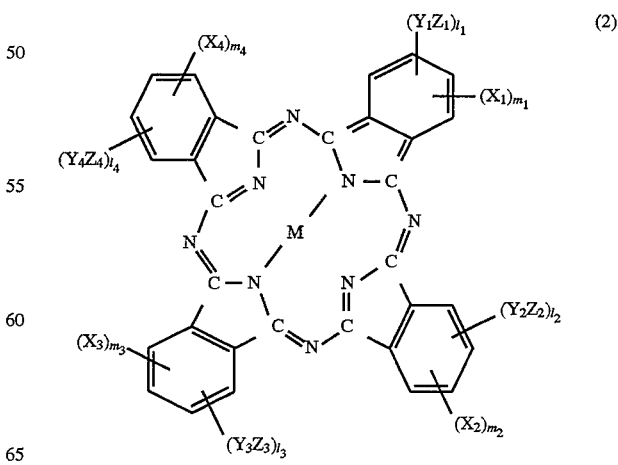

wherein M represents two hydrogen atoms or a metal, metal oxide or metal halide, $Y_1$, $Y_2$, $Y_3$ and $Y_4$ independently represent an oxygen or sulfur atom, $Z_1$, $Z_2$, $Z_3$ and $Z_4$ independently represent a substituted or unsubstituted hydrocarbon group having 4 to 12 carbon atoms, $X_1$, $X_2$, $X_3$ and $X_4$ independently represent a halogen atom, $l_1$, $l_2$, $l_3$ and $l_4$ independently represent 1 or 2, and $m_1$, $m_2$, $m_3$ and $m_4$ independently represent an integer of 0 to 3.

Specific examples of M in the phthalocyanine compounds represented by the formula (2) include divalent metals such as Cu, Pd, Ni, Mg, Zn, Pb and Cd; metal oxides such as VO; and metal halides such as AlCl. On the other hand, $Z_1$, $Z_2$, $Z_3$ and $Z_4$ are individually a substituted or unsubstituted hydrocarbon group having 4 to 12 carbon atoms or a group containing 4 to 12 carbon atoms and at least one element selected from oxygen, nitrogen, sulfur or a halogen. Specific examples include saturated hydrocarbon groups such as butyl, pentyl, hexyl, heptyl, octyl, nonyl, decyl, dodecyl, cyclohexyl and dimethylcyclohexyl; unsaturated hydrocarbon groups such as butenyl, hexenyl, octenyl and dodecenyl; and aromatic hydrocarbon groups such as phenyl, methylphenyl, butylphenyl and hexylphenyl. These hydrocarbon groups may be either linear or branched. Further, these hydrocarbon groups may be substituted by one or more halogen atoms, amino groups, ether groups and/or the like. Even when substituted by such amino groups and/or ether groups, the number of all the carbon atoms in the substituents ($Z_1$ to $Z_4$) should be in the range of from 4 to 12. Exemplary halogen atoms represented by $X_1$, $X_2$, $X_3$ and $X_4$ include fluorine, chlorine, bromine, iodine and the like.

No particular limitation is imposed on the position of substitution by the substituents $X_1$ to $X_4$ and the substituents $Y_1$ to $Y_4$ bonded to the benzene rings forming the phthalocyanine. Further, the kinds and number of such substituents may vary among the four benzene rings in the same single molecule.

Among the above-described phthalocyanine dyes, $l_1$ to $l_4$ may preferably be 1 from the viewpoint of recording characteristics such as error rate and jitter.

As preferred specific examples of phthalocyanine dyes, dyes disclosed, for example, in Japanese Patent Laid-open Nos. 62878/1991, 141582/1991 and 215466/1991 can be mentioned. Specifically, the following compounds can be mentioned:

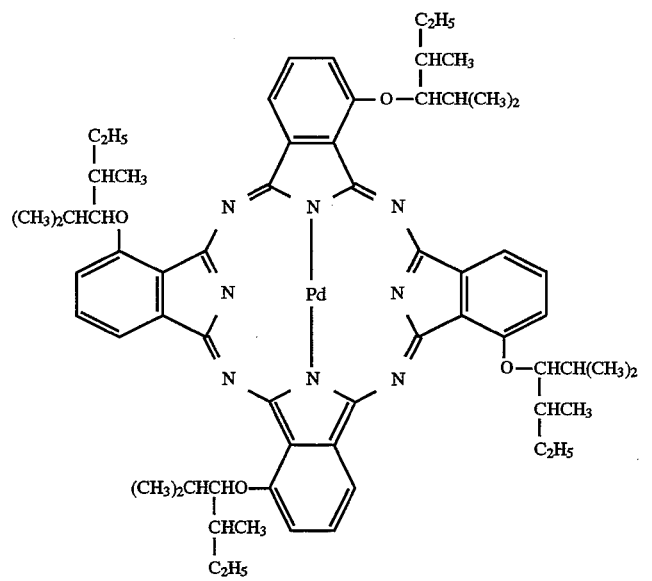

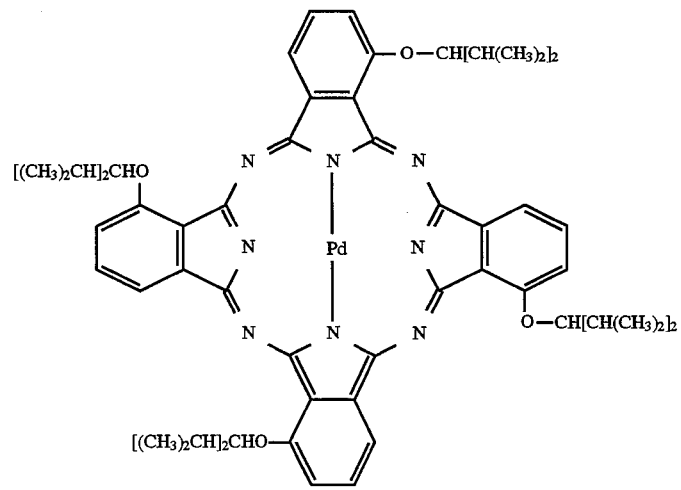

-continued
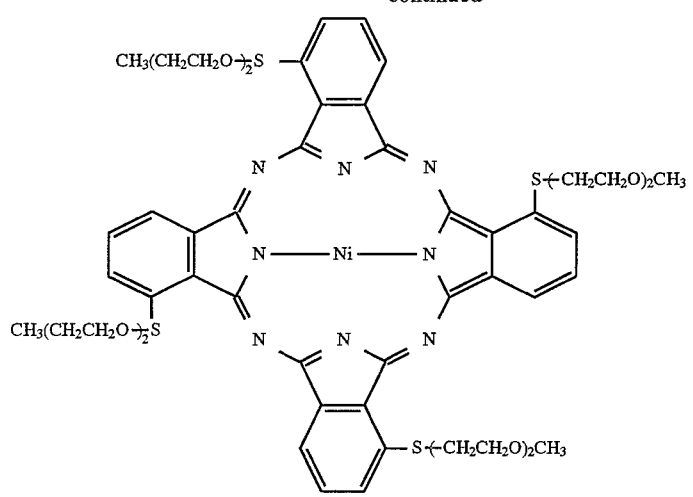
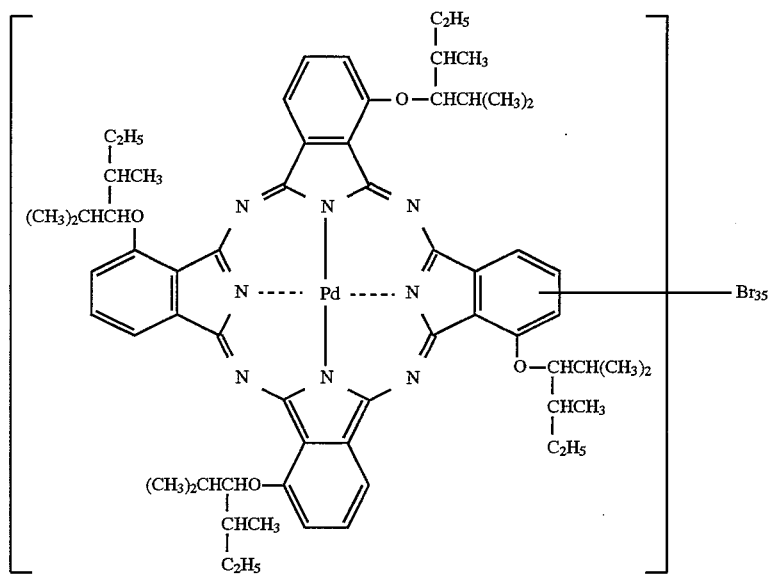
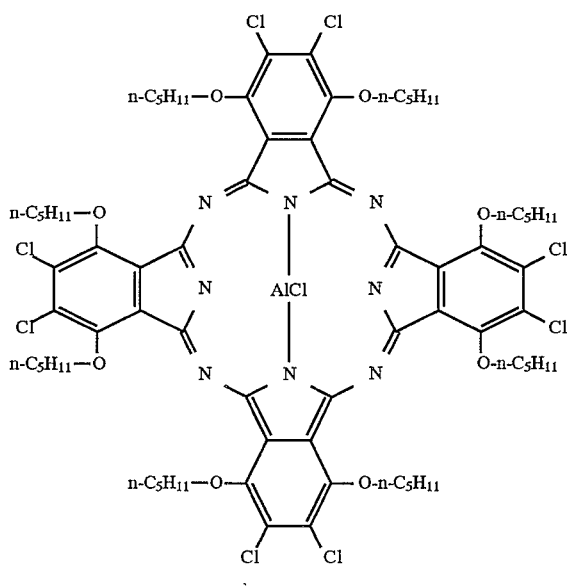

-continued
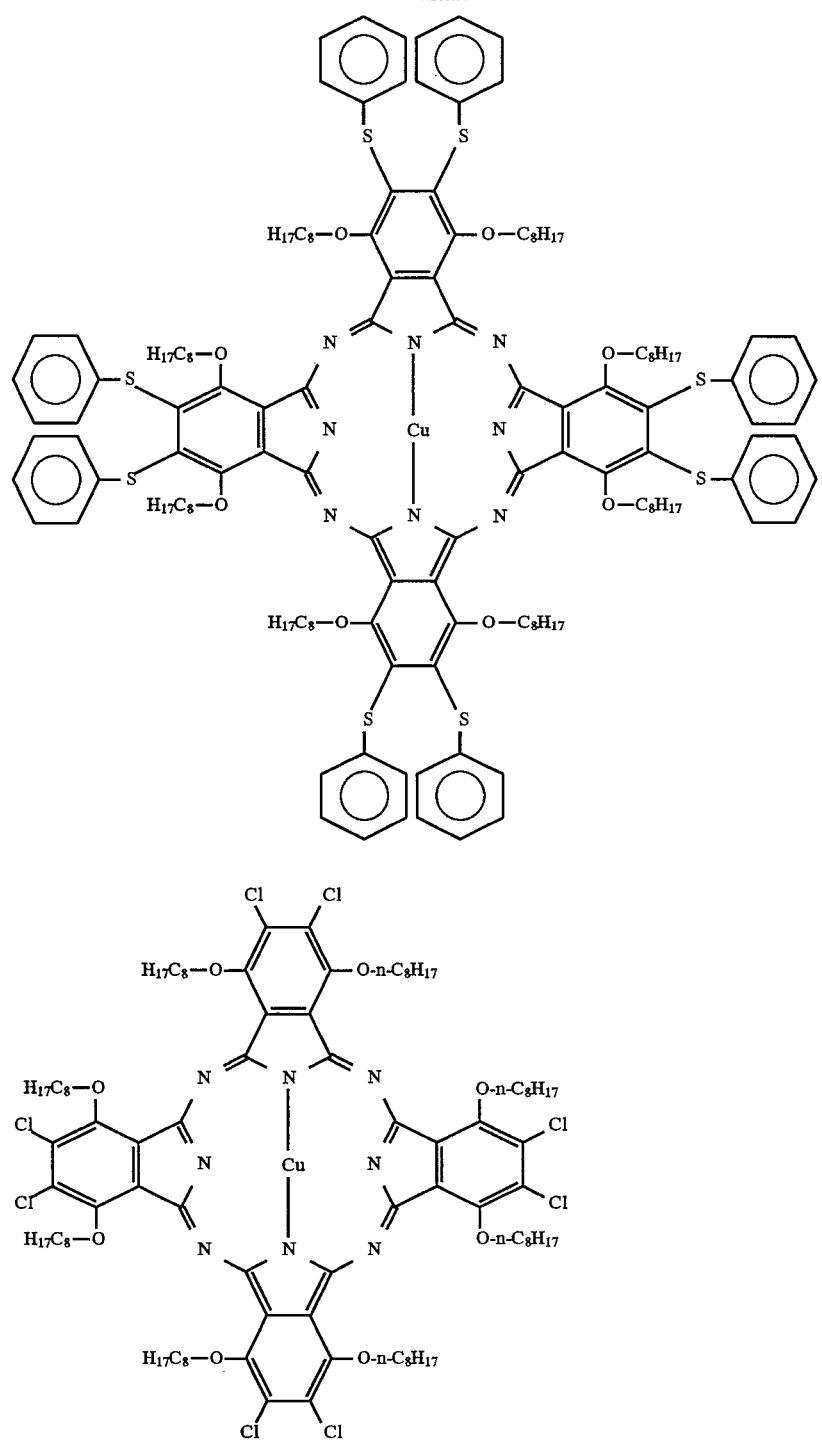

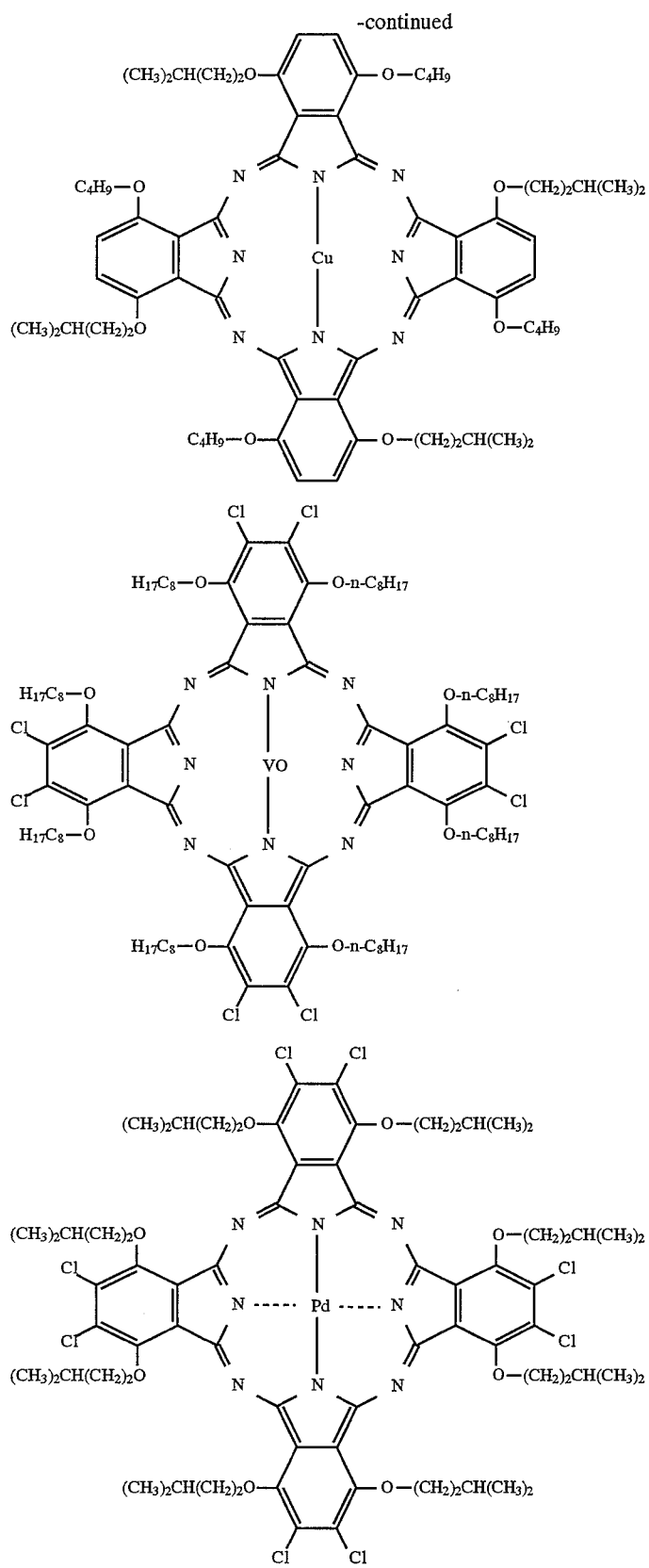
Further, as penta- or heptamethinecyanine compounds, the following compounds are preferred:

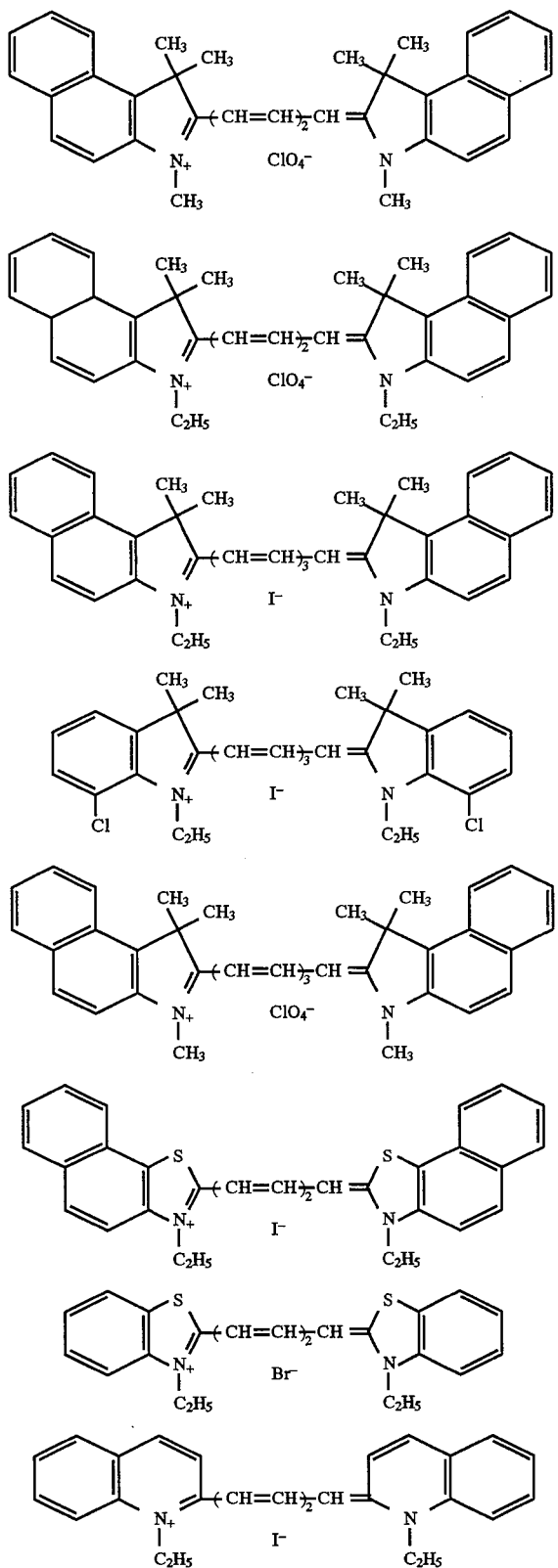

In the present invention, these compounds, dyes or the like selected for the formation of a recording layer are applied by a coating technique such as spin coating or casting, sputtering, chemical vapor deposition, vacuum vapor deposition or the like, whereby a recording layer of 50 to 500 nm, preferably, 100 to 150 nm in thickness is formed on a substrate. A coating formulation with the dye either dissolved or dispersed in a solvent is used especially in the coating technique. Here, it is preferred to choose a solvent which does not give any damage to the substrate. Usable examples of the solvent include alcoholic solvents such as methanol; aliphatic hydrocarbon solvents such as hexane and octane; cyclic hydrocarbon solvents such as cyclohexane; aromatic hydrocarbon solvents such as benzene; halogenated hydrocarbon solvents such as chloroform; ether solvents such as dioxane; cellosolve solvents such as methylcellosolve; ketone solvents such as acetone; and ester solvents such as ethyl acetate. They can be used either singly or in combination. Further, instead of providing only one recording layer, plural dyes can be applied separately in the form of plural layers. The dye can also be used in the form of a thin polymer film, for example, by dispersing it in a polymer, preferably, at a concentration of 50 wt. % or so. Where it is impossible to find such a solvent as giving no damage to the substrate, sputtering, chemical vapor deposition, vacuum vapor deposition or the like is effective.

A reflective layer is next formed to a thickness of 50 to 300 nm, preferably, 100 to 150 nm over the recording layer. The material of the reflective layer can be one providing a sufficiently high reflection at the wavelength of a reproducing laser beam. For example, metals such as Au, Al, Ag, Cu, Ti, Cr, Ni, Pt, Ta, Co and Pd can be used either singly or as alloys. Among these, Au and Al have high reflectance and are suited as materials for the reflective layer. Other materials may also be included, for example, metals and semimetals such as Mg, Se, Hf, V, Nb, Ru, W, Mn, Re, Fe, Co, Rh, Ir, Cu, Zn, Cd, Ga, In, Si, Ge, Te, Pb, Po, Sn and Bi.

A material composed primarily of Au is preferred because it can readily provide a reflective layer of high reflectance. The term "primarily" as used herein means an Au content of 50% or higher. It is also possible to alternately stack, with materials other than metals, thin films of low refractive index and thin films of high refractive index one over the other into a multi-layered film and then to use it as a reflective layer.

As a method for the formation of the reflective layer, sputtering, chemical vapor deposition, vacuum deposition or the like can be mentioned. Further, to increase the reflectance and/or to improve the adhesion, it is also possible to arrange a reflex amplifier layer or an adhesive layer between the recording layer and the reflective layer, respectively.

The optical recording medium of the present invention fabricated as described above is a medium with a recording layer and a reflective layer, both, formed on a substrate. The reflectance to a laser beam of a wavelength selected from the range of 620 to 690 nm as measured through the substrate is 15% or higher, preferably 20% or higher, and more preferably 25% or higher. Further, the reflectance to a laser beam of a wavelength selected from the range of 770 to 830 nm as measured through the substrate is 65% or higher, preferably, 70% or higher. It can therefore meet the Red Book (CD) Specification and the Orange Book (CD-R) Specification. Insofar as these specifications are met, the optical recording medium can be successfully played even by a CD player which has already been available on the market.

A protective layer can also be formed over the reflective layer. No particular limitation is imposed on the material of the protective layer insofar as it can protect the reflective layer from external force.

An appropriate material can be chosen from organic materials and inorganic materials. Illustrative organic materials can include thermoplastic resins, thermosetting resins, UV-curable resins and the like, with UV-curable resins being preferred. On the other hand, exemplary inorganic materials can include $SiO_2$, $SiN_4$, $SnO_2$ and the like. A thermoplastic resin or thermosetting resin can be formed into a protective layer by dissolving it in a suitable solvent to provide a coating formulation, applying it and then drying the same. A UV-curable resin can be formed into a protective layer by dissolving it in a suitable solvent to provide a coating formulation, applying the coating formulation and exposing it to UV light to cure the same. Usable examples of the UV-curable resins include acrylate resins such as urethane acrylate resins, epoxy acrylate resins, and polyester acrylate resins. These materials can be used either singly or in combination. No problem or inconvenience will be encounter even if the above-mentioned material is used in the form of multi-layered films instead of a single layer.

As a method for the formation of the protective layer, a coating technique such as spin coating or casting, sputtering, chemical vapor deposition or the like is used as in the case of the recording layer. Of these, spin coating is preferred.

No particular limitation is imposed on the red laser in the present invention, insofar as it is a laser beam having a wavelength of 620 to 690 nm. Illustrative usable red laser beams include dye laser beams whose wavelengths can be chosen within a wide range of the visible range, helium/neon laser of 633 nm in wavelength, and recently developed, high-power semiconductor lasers having wavelengths of 635 nm and 680 nm, respectively. In view of mounting on an instrument, a semiconductor laser is preferred. Further, the near infrared laser may be any laser as long as its wavelength is 770 to 830 nm. A semiconductor lasers employed in commercial CD players and CD recorders are suited.

Examples of the present invention will hereinafter be described. It should however be borne in mind that the present invention is not restricted by or to the following examples.

EXAMPLE 1

A porphyrin compound (0.2 g) represented by the following formula (A):

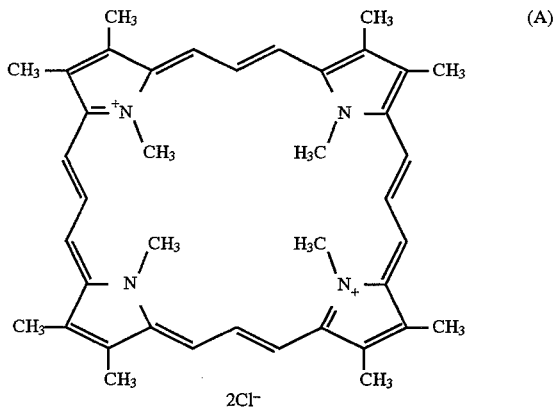

and as a light absorber, 0.02 g of a pentamethine cyanine dye "NK2929" [trade name for 1,3,3,1',3',3'-hexamethyl-2,2'-(4, 5,4',5'-dibenzo)indodicarbocyanine perchlorate); product of Nihon Kanko Shikiso Kenkyusho] were dissolved in 10 ml of diacetone alcohol (product of Tokyo Kasei Kogyo Co., Ltd.), whereby a dye solution was prepared. A disk, which was made of a polycarbonate resin, was provided with a continuous pregroove (track pitch: 1.6 μm) and had a diameter of 120 mm and a thickness of 1.2 mm, was employed as a substrate. The dye solution was spin-coated at 1,500 rpm on the substrate and dried at 70° C. for 2 hours to form a recording layer of 150 nm in thickness. Using a sputtering apparatus ["CDI-900", trade name; manufactured by Bulsers Corp.], Au was sputtered on the recording layer so that a reflective layer of 100 nm in thickness was formed. Argon gas was used as a sputtering gas. The sputtering was conducted under the following conditions: sputtering power, 2.5 KW; sputtering gas pressure, $1.0 \times 10^{-2}$ Torr. Further, an ultraviolet curable resin "SD-17" (trade name; product of Dainippon Ink & Chemicals, Incorporated) was spin-coated on the reflective layer, followed by the exposure to ultraviolet rays to form a protective layer of 6 μm in thickness. Using an optical disk evaluation instrument equipped with a 635 nm red semiconductor laser ["DDU-1000", trade name; manufactured by Pulstec Kogyo K.K.] and an EFM encoder manufactured by KENWOOD CORP., the thus-obtained sample was recorded at 5.6 m/s linear speed and 10 mW laser power. After the recording, signals were reproduced using the same evaluation instrument. As a result, an eye pattern closed at the center of an eye was observed. Further, the recorded sample was played for evaluation by a commercial CD player whose reproduction wavelength was 780 nm. As a result, accurate reproduction was found to be feasible with 75% reflectance and 3 cps error rate. The recorded sample was also confirmed to be playable even by a reproducing equipment making use of a near infrared semiconductor laser head.

EXAMPLE 2

An optical recording medium was fabricated in a similar manner to Example 1 except that a porphyrin dye represented by the following formula (B):

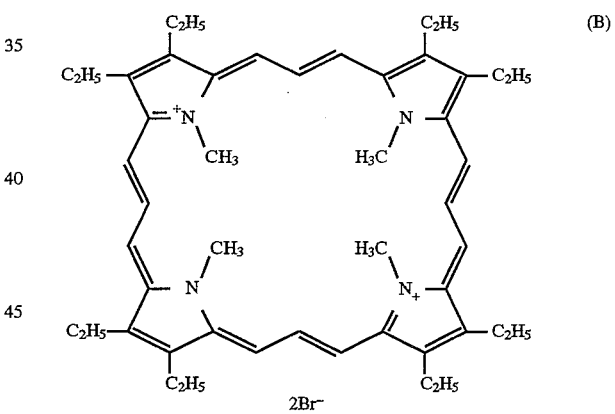

was used in lieu of the dye (A). Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be 28%. Further, the recorded sample was played for evaluation by the commercial CD player whose reproduction wavelength was 780 nm. As a result, accurate reproduction was found to be feasible with 74% reflectance and 3 cps error rate.

EXAMPLE 3

An optical recording medium was fabricated in a similar manner to Example 1 except that a porphyrin dye represented by the following formula (C):

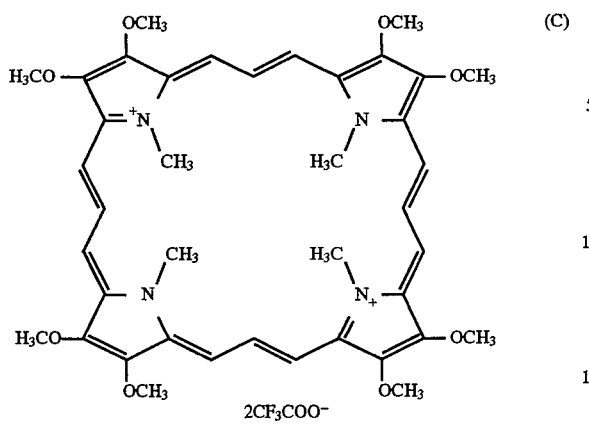

2CF₃COO⁻ was used in place of the dye (A). Using the optical disk evaluation instrument equipped with a 680 nm semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 7 mW laser power. After the recording, signals were reproduced using the sue evaluation instrument. As a result, the reflectance was found to be 75%. Further, the recorded sample was played for evaluation by an equipment whose reproduction wavelength was 635 nm. As a result, accurate reproduction was found to be feasible with 34% reflectance and 4 cps error rate.

EXAMPLE 4

An optical recording medium was fabricated in a similar manner to Example 1 except that a porphyrin dye represented by the following formula (D):

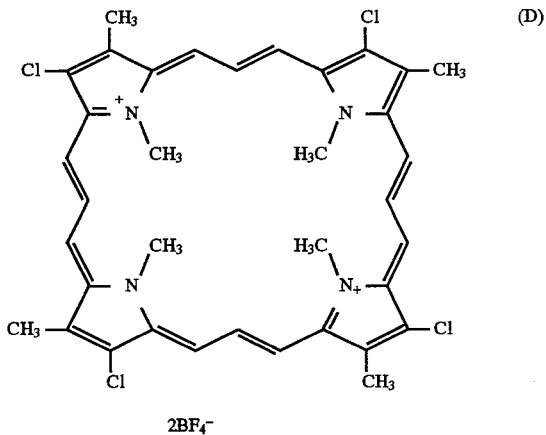

2BF₄⁻ was used instead of the dye (A). Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be 33%. Further, the recorded sample was played for evaluation by the commercial CD player whose reproduction wavelength was 780 nm. As a result, accurate reproduction was found to be feasible with 71% reflectance and 3 cps error rate.

EXAMPLE 5

An optical recording medium was fabricated in a similar manner to Example 1 except that a porphyrin dye represented by the following formula (E):

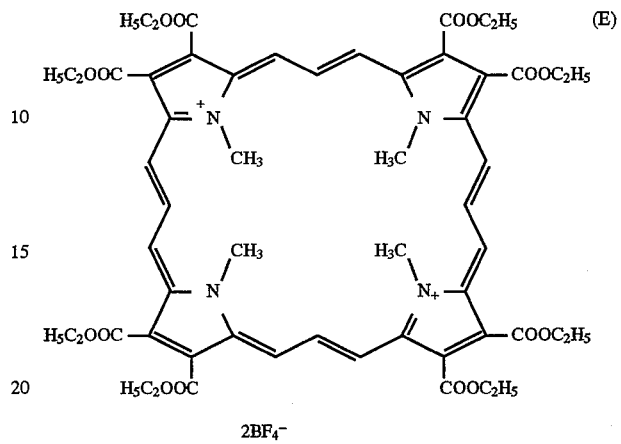

2BF₄⁻ was used instead of the dye (A). Using the optical disk evaluation instrument equipped with the 635 nm red semiconductor laser ["DDU-1000", trade name; manufactured by. Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be 31%. Further, the recorded sample was played for evaluation by the commercial CD player whose reproduction wavelength was 780 nm. As a result, accurate reproduction was found to be feasible with 76% reflectance and 3 cps error rate.

EXAMPLE 6

An optical recording medium was fabricated in a similar manner to Example 1 except that a porphyrin dye represented by the following formula (F):

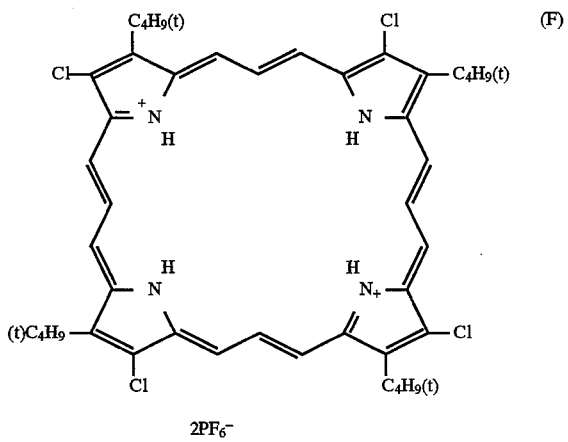

2PF₆⁻ was used instead of the dye (A). Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be 33%. Further, the recorded sample was played for evaluation by the commercial CD player whose reproduction wavelength was 780 nm. As a result, accurate reproduction was found to be feasible with 75% reflectance and 2 cps error rate.

EXAMPLE 7

An optical recording medium was fabricated in a similar manner to Example 1 except that a porphyrin dye represented by the following formula (G):

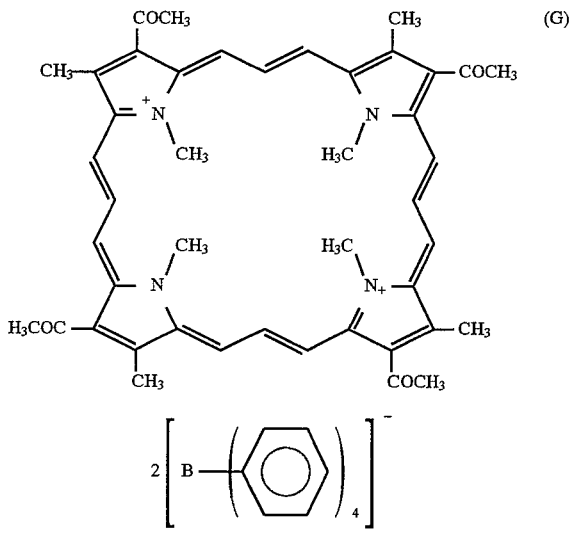

was used instead of the dye (A). Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be 25%. Further, the recorded sample was played for evaluation by the commercial CD player whose reproduction wavelength was 780 nm. As a result, accurate reproduction was found to be feasible with 70% reflectance and 4 cps error rate.

EXAMPLE 8

An optical recording medium was fabricated in a similar manner to Example 1 except that a phthalocyanine dye represented by the following formula (H):

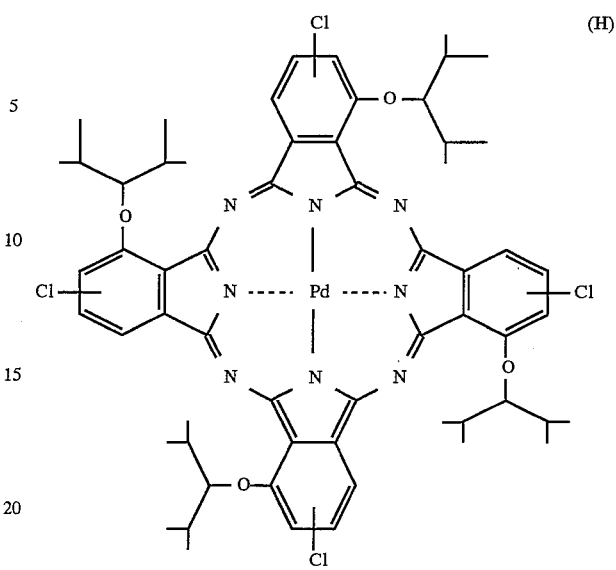

was used instead of the light absorber "NK2929". Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 8 mW laser power. After the recording, signals were reproduced using the same evaluation instrument. As a result, the reflectance was found to be 30%. Further, the recorded sample was played for evaluation by the commercial CD player whose reproduction wavelength was 780 nm. As a result, accurate reproduction was found to be feasible with 70% reflectance and 3 cps error rate. On the other hand, the unrecorded sample was similarly recorded by an instrument equipped with a 780 nm semiconductor laser, followed by reproduction by the same instrument. Accurate reproduction was found to be feasible with 73% reflectance and 4 cps error rate. Further, the same recorded sample was also played by the above-described instrument equipped with the 635 nm semiconductor laser. Accurate reproduction was also found to be feasible with 34% reflectance and 2 cps error rate.

EXAMPLE 9

An optical recording medium was fabricated in a similar manner to Example 1 except that a phthalocyanine dye represented by the following formula (I):

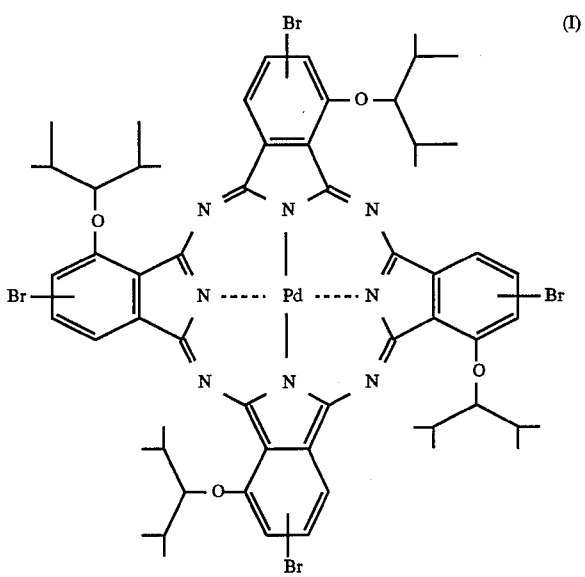

(I)

was used instead of the light absorber "NK2929". Using the optical disk evaluation instrument equipped with the 780 nm semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 6 mW laser power. After the recording, signals were reproduced using the same evaluation instrument. As a result, the reflectance was found to be 73%. Further, the recorded sample was played for evaluation by the instrument whose reproduction wavelength was 635 nm. As a result, accurate reproduction was found to be feasible with 30% reflectance and 4 cps error rate.

EXAMPLE 10

An optical recording medium was fabricated in a similar manner to Example 1 except that the dye solution was used without the pentamethinecyanine dye, "NK2929". The sample medium was similarly recorded and then played, using the above-described instrument equipped with the 635 nm red semiconductor laser. As a result, an eye pattern closed at the center of an eye was observed. The reflectance and error rate at that time were 31% and 5 cps, respectively, thereby confirming the capability of accurate reproduction.

COMPARATIVE EXAMPLE 1

An optical recording medium was fabricated in a similar manner to Example 1 except for the omission of the porphyrin dye (A). Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be as low as 9% or so and waveform was found to involve distortion. Moreover, the signals were deteriorated when reproduced for a long time. Further, the recorded sample was played for evaluation by the commercial CD player whose reproduction wavelength was 780 nm. As a result, accurate reproduction was found to be poor with 2,980 cps error rate.

COMPARATIVE EXAMPLE 2

An optical recording medium was fabricated in a similar manner to Example 1 except that the porphyrin dye (A) was omitted and a pentamethinecyanine dye "NK2627" [trade name for 3,3'-diethyl-2,2'-(6,7,6',7'-dibenzo) thiadicarbocyanine diiodide; product of Nihon Kanko Shikiso Kenkyusyo] was employed as a light absorber. Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be as low as 8% and the waveform was found to involve distortion. Moreover, the signals were deteriorated when reproduced for a long time. Further, the recorded sample was played for evaluation by the commercial CD player whose reproduction wavelength was 780 nm. As a result, accurate reproduction was found to be poor with 3,320 cps error rate.

COMPARATIVE EXAMPLE 3

An optical recording medium was fabricated in a similar manner to Example 1 except that the porphyrin dye (A) was omitted and a pentamethinecyanine dye "NK1456" [trade name for 1,1'-diethyl-2,2'-quinodicarbocyanine iodide; product of Nihon Kanko Shikiso Kenkyusyo] was employed as a light absorber. Using the optical disk evaluation instrument equipped with the 635 nm red semiconductor laser ["DDU-1000", trade name; manufactured by Pulstec Kogyo K.K.] and the EFM encoder manufactured by KENWOOD CORP. as in Example 1, the thus-obtained medium was recorded at 5.6 m/s linear speed and 10 mW laser power. After the recording, signals were reproduced using the same evaluation instrument. As a result, the reflectance was found to be as low as 6% or so and the waveform was found to involve distortion. Moreover, the signals were deteriorated when reproduced for a long time. Further, the recorded sample was played for evaluation by the commercial CD player whose reproduction wavelength was 780 nm. As a result, accurate reproduction was found to be poor with 3,570 cps error rate.

What is claimed is:

1. An optical recording medium comprising a recording layer, a reflective layer and a protective layer, all arranged on a substrate and permitting at least reproduction with a red laser having a wavelength of from 620 to 690 nm, said recording layer comprising:

(a) a porphyrin compound represented by the following formula (1):

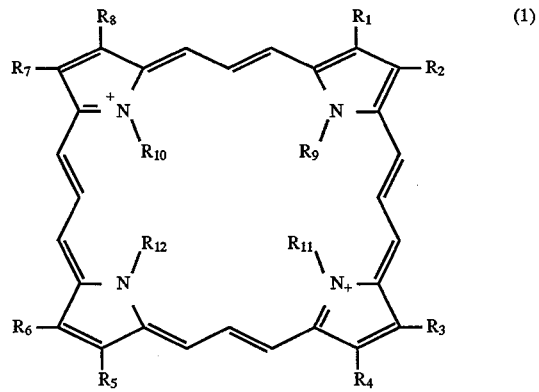

(1)

2X⁻ wherein $R_1$ to $R_8$ independently represent a hydrogen atom, an alkyl group, an alkoxy group, an alkylcarbonyl group, an alkoxycarbonyl group, an alkylthio group or a halogen atom, $R_9$ to $R_{12}$ independently represent a hydrogen atom or an alkyl group, and $X^-$ represents an anion; and (b) a light absorbing compound having an absorption maximum in a wavelength range of from 650 to 900 nm, wherein said optical recording medium has a reflectance of at least 65% to a beam selected from near infrared lasers of 770 to 830 nm in wavelength as measured through the substrate and permits reproduction with a near infrared laser having a wavelength selected from 770 to 830 nm.

2. An optical recording medium according to claim 1, wherein said optical recording medium has a reflectance of at least 15% to a beam selected from red lasers of 620 to 690 nm in wavelength as measured through the substrate and permits at least reproduction with a red laser having a wavelength of from 620 to 690 nm.

3. An optical recording medium according to claim 2, wherein said optical recording medium permits recording and reproduction with a near infrared laser having a wavelength selected from 770 to 830 nm.

4. An optical recording medium according to claim 1, wherein said optical recording medium has a reflectance of at least 15% to a beam selected from red lasers of 620 to 690 nm in wavelength as measured through the substrate and permits recording and reproduction with a red laser having a wavelength selected from 620 to 690 nm.

5. An optical recording medium according to claim 4, wherein said optical recording medium permits recording and reproduction with a near infrared laser having a wavelength selected from 770 to 830 nm.

6. An optical recording medium according to claim 1, wherein said light absorbing compound is a phthalocyanine compound.

7. An optical recording medium according to claim 1, wherein said light absorbing compound is a penta- or heptamethinecyanine compound.

* * * * *